United States Patent
Holdrege

[15] 3,669,958
[45] June 13, 1972

[54] 6-[N-(SUBSTITUTED-IMIDOYL)-AMINOACETAMIDO]PENCILLANIC ACIDS

[72] Inventor: Charles Truman Holdrege, Camillus, N.Y.

[73] Assignee: Bristol-Myers Company, New York, N.Y.

[22] Filed: June 29, 1970

[21] Appl. No.: 50,997

[52] U.S. Cl.....................................260/239.1, 424/271
[51] Int. Cl.....................................C07d 99/14, C07d 99/24
[58] Field of Search.................................260/239.1

[56] References Cited

UNITED STATES PATENTS

| | | | |
|---|---|---|---|
| 3,454,557 | 7/1969 | Patchett et al. | 260/239.1 |
| 3,453,265 | 7/1969 | Patchett et al. | 260/239.1 |
| 3,479,339 | 1/1969 | Holdrege | 260/239.1 |
| 3,481,922 | 12/1969 | Holdrege | 260/239.1 |
| 3,483,188 | 12/1969 | McGregor | 260/239.1 |

*Primary Examiner*—Nicholas S. Rizzo
*Attorney*—Herbert W. Taylor, Jr., Robert E. Havranek, Richard H. Brink and James Magee, Jr.

[57] ABSTRACT

6-[N-(substituted-imidoyl)aminoacetamido]penicillanic acids and their salts are valuable as antibacterial agents, nutritional supplements in animal feeds, therapeutic agents in poultry and animals, including man, and are especially useful in the treatment of infectious diseases caused by Gram-positive and certain Gram-negative bacteria, most particularly those caused by the Proteus genus. 6-[N-(Phenylacetimidoyl)-aminoacetamido]penicillanic acid, a preferred embodiment of the invention, is prepared by Raney nickel hydrogenation (50 p.s.i., R.T.) of an aqueous solution of sodium 6-(3-benzyl-1,2,4-oxadiazole-5-one-4-acetamido)penicillanate which is prepared in turn by reaction of 6-aminopenicillanic acid with 3-benzyl-1,2,4-oxadiazole-5-one-4-acetyl chloride.

12 Claims, No Drawings

6-[N-(SUBSTITUTED-IMIDOYL)-AMINOACETAMIDO]PENCILLANIC ACIDS

BACKGROUND OF THE INVENTION

1. Field of the Invention

The penicillins of the present invention possess the usual attributes of such compounds and are particularly useful in the treatment of infections caused by Proteus and certain other Gram-negative bacteria.

2. Description of the Prior Art

Heretofore very few penicillins have been found to possess any significant activity against Proteus. The compounds of the present invention exhibit this desirable activity at significantly low concentrations.

Aminomethylpenicillin and its N-carbobenzyloxy derivative are known from U. S. Pat. Nos. 3,120,514 and 2,941,995 respectively; see also U. S. Pat. No. 3,453,263. For α-guanidinomethylpenicillin see U. S. Pat. Nos. 3,406,185 and 3,454,557.

α-Aminobenzylpenicillins and α-aminothenylpenicillins are known, as from U. S. Pat. Nos. 2,985,648, 3,140,282, 3,373,156, 3,308,023 and 3,342,677 and British Pat. Nos. 903,785, 918,169, 978,178, 991,586 and 1,033,257 and for such compounds bearing substituents on the α-amino group from U. S. Pat. Nos. 3,198,804, 3,308,023, 3,381,001 3,448,104, 3,453,264, 3,471,474, 3,479,339, 3,481,922 and 3,483,188 and from such British Pat. as Nos. 891,777, 894,457, 1,040,166, 1,048,907, 1,051,675, 1,053,415, 1,053,818, 1,057,697, 1,064,893, 1,066,107, 1,080,247, 1,125,339, 1,130,445, 1,134,237 and 1,138,745 and from South Africa Pat. No. 67/2092. N-Substituted 6-ureidopenicillanic acids have been disclosed, for example in U. S. Pat. Nos. 3,118,877, 3,120,512 and 3,180,863 and in Belgian Patent 603,703 and German Pat. No. 1,120,072; 6-ureidopenicillanic acid itself is disclosed in German Pat. Nos. 1,141,640 and 1,120,072 and French Pat. No. 1,324,918. A few substituted α-ureidomethylpenicillins are disclosed in U. S. Pat. No. 3,352,851 and British Pat. No. 1,040,166. British Pat. No. 1,061,335 discloses 6-(D-α-hydrazinocarbonylamino-α-phenyl-acetamido)penicillanic acid and 6-(D-α-benzyloxycarbonylhydrazinocarbonylamino-α-phenylacetamido)penicillanic acid and, in general. other so-called acyl groups in place of the benzyloxycarbonyl group.

A variety of α-guanidino-arylmethylpenicillins including α-guanidinomethylpenicillin are disclosed in U.S. Pat. Nos. 3,406,185, 3,454,557 and 3,479,401 and British Pat. No. 1,164,457.

With regard to the penicillins used as intermediates in the present invention, numerous methylpenicillins having attached at the alpha position a heterocyclic ring containing two or three or four hetero-atoms and often other substituents on the heterocyclic nucleus are reported in the literature, e.g. in U. S. Pats. classified in sub-class 260-239.1 as exemplified most recently by U. S. Pat. Nos. 3,476,743, 3,468,874, 3,427,302, 3,322,751, 3,322,750 and 3,296,250.

N-Benzoylaminomethylpenicillin was reported in South African Pat. No. 60/2882 to Lovens and N-phenylacetylaminomethylpenicillin was disclosed in Zhur. Org. Khim 1(2), 348–352 (1965).

SUMMARY OF THE INVENTION

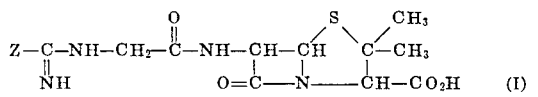

and

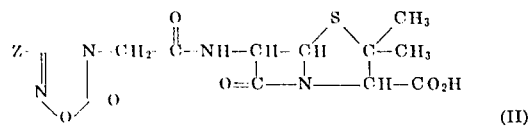

wherein Z is (lower)alkyl, cycloalkyl having 4, 5, 6 or 7 carbon atoms, monohalo(lower)alkyl, dichloromethyl, trichloromethyl, (lower)alkenyl of two to six carbon atoms,

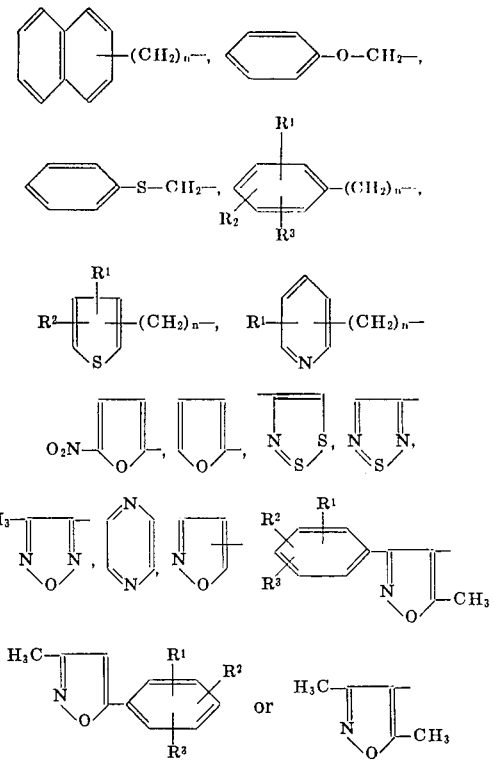

wherein $n$ is zero or one and $R^1$, $R^2$ and $R^3$ each is hydrogen, nitro, di(lower)alkylamino, (lower)alkanoylamino, (lower)alkanoyloxy, (lower)alkyl (comprising straight and branched chain saturated aliphatic groups having from one to six carbon atoms inclusive), amino, hydroxy, (lower)alkylthio, (lower)alkoxy, sulfamyl, chloro, iodo, bromo, fluoro or trifluoromethyl; and nontoxic, pharmaceutically acceptable salts thereof, e.g., with a metallic cation such as sodium, potassium, calcium, aluminum, and the like, the ammonium cation and substituted ammonium cations, e.g., cations of such nontoxic amines as tri(lower)alkylamines, i.e., triethylamine, etc., procaine, dibenzylamine, N-benzyl-beta-phenethylamine, 1-ephenamine, N,N'-dibenzylethylenediamine, dehydroabietylamine, N,N'-bis-dehydroabietylethylenediamine, N-(lower)alkylpiperidine, e.g., N-ethylpiperidine, or other such amines which have been used to form pharmaceutically acceptable nontoxic salts with benzylpenicillin. Such salts are preferably made by treatment of the free acid (zwitterion in the compounds of formula I) form of the product with a strong base. In addition the compounds of formula I form acid addition salts including the mineral acid addition salts such as the hydrochloride, hydrobromide, hydroiodide, sulfate, sulfamate and phosphate and the organic acid addition salts such as the maleate, fumarate, malate, mandelate, ascorbate, para-toluenesulfonate, β-naphthalenesulfonate, and the like.

In the preferred embodiments of this invention the compounds exist in the zwitterion form and Z is phenyl, benzyl, thenyl, thienyl, furyl or (lower)alkyl and preferably, benzyl, 2-thenyl or 3-thenyl.

DETAILED DESCRIPTION

Antibacterial agents such as ampicillin (U. S. Pat. No. 2,985,648) have proved highly effective in the past in the therapy of infections due to Gram-positive and Gram-negative bacteria but these compounds have been notably lacking in their ability to effectively control Proteus infections.

It was an object of the present invention to provide compounds useful in the treatment of infections caused by Gram-positive and Gram-negative bacteria, including particularly those caused by Proteus.

The compounds of the present invention as defined above under "Summary of the Invention" are particularly useful in that they possess antibacterial activity against both Gram-positive and Gram-negative bacteria, and most particularly exhibit activity against Proteus infections.

Included within the scope of the present invention are easily hydrolyzed esters which are converted to the free acid form by chemical or enzymatic hydrolysis, as illustrated in Belgian Pat. No. 684,288 and in U. S. Pat. No. 3,399,207.

The penicillins of the present invention containing the $\alpha$-(3-substituted-1,2,4-oxadiazol-5-one-4-yl) group are primarily useful as intermediates for the preparation of the corresponding penicillins containing the 6- N-(substituted-imidoyl)aminomethyl side chain. The latter are far more potent antibacterial agents.

In the treatment of bacterial infections in man, the penicillins of this invention containing the latter side chain are administered topically, orally and parenterally in accordance with conventional procedures for antibiotic administration in an amount of from about 5 to 125 mg./kg/day and preferably in the range of 15 to 50 mg./kg./day for Proteus infections in divided dosages, e.g., three or four times a day. They are administered in dosage units containing, for example, 125, 250, 500, 1,000 and 2,000 mg. of active ingredient with suitable physiologically acceptable carriers or excipients. The dosage units can be in the form of liquid preparations such as solutions, dispersions, emulsions or in solid form such as tablets, capsules, etc.

The compounds of the present invention are also useful for decontamination of filling machines and containers used for cosmetics and topical drugs to prevent or at least reduce the very common contamination of such products with Proteus. In such instance, use is made of an aqueous solution having a concentration of at least 1 mgm./ml. and a contact time of at least one hour.

The compounds of Formula II above are prepared by the process which comprises coupling with 6-aminopenicillanic acid in the usual manner an acid of the formula

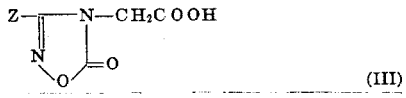

(III)

preferably as the acid chloride, wherein Z has the meaning set out above.

The compounds of Formula II above are converted into those of Formula I by hydrogenation and preferably by hydrogenation at about room temperature over Raney nickel catalyst of an aqueous solution of a salt of the compound of Formula II and preferably a sodium or potassium salt. The hydrogen pressure is preferably about 50 p.s.i. or higher.

The starting acids of formula III are prepared by standard methods of synthesis from known nitriles by the following reaction scheme wherein Z has the meaning set out above (and as illustrated in the Examples below):

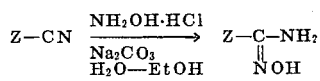

per Beil. 9 304, II 214 and references therein and in Chem. Rev. 62, 155 (1962)

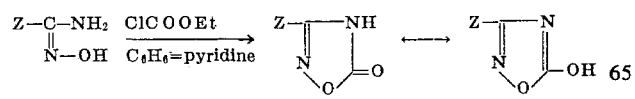

per Beil. 27, 644, II 698 and references therein or via Helv. Chim. Acta 47, 838 (1964) or U.S. Pat. 3,264,318 and also according to H. Ulrich, the Chemistry of Imidoyl Halides, Plenum Press, 1968 at pages 86–87 and according to the references therein, and according to Chem. Abst. 65, 18576d.

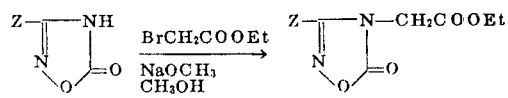

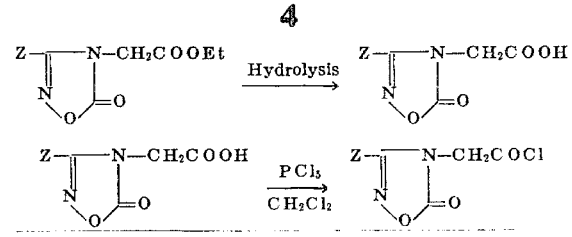

Additional examples of such intermediates found in the literature include the following:

| Structure | References |
|---|---|
| phenyl-C(=NOH)-NH₂ | Beil. 9, 304, II 214. |
| furyl-C(=NOH)-NH₂ | C.A. 52, 7292 b. |
| thienyl-C(=NOH)-NH₂ | Beil. 18, 290. |
| phenyl-CH₂-C(=N-OH)-NH₂ | Beil. 9, 446, II 305. |
| phenyl-oxadiazolone-OH | Beil. 27, 644, II 698 and references therein. |
| pyridyl-oxadiazolone-OH | C.A. 62, P5283 b; Neth. Appl. 6,402,833; C.A. 68, P95829 t. |
| phenyl-CH₂-oxadiazolone-OH | Beil. 27, II 710. |
| phenyl-CH=CH-oxadiazolone-OH | Ber. 22, 2399. |
| (CH₃O)₂-phenyl-oxadiazolone-OH | C.A. 68, P95829 t. |
| Br-phenyl-oxadiazolone-OH | C.A. 68, 21886 n; C.A. 69, 96597 y. |
| phenyl-oxadiazolone-OH | Do. |
| Cl-phenyl-oxadiazolone-OH | Do. |
| Cl-phenyl-oxadiazolone-OH | C.A. 68, 21886 n. |
| F-phenyl-oxadiazolone-OH | C.A. 68, 21886 n; C.A. 69, 96597 y. |

| Structure | References |
|---|---|
| (phenyl-NO2)-oxadiazole-OH | Do. |
| O2N-C6H4-oxadiazole-OH | C.A. 68, 21886 n; C.A. 69, 96597 y; Berichte, 22, 2418 (1889). |
| thiophene-CH2CN | Campaigne, McCarthy, JACS, 76, 4466 (1954); Campaigne, Le Suer, JACS, 70, 155 (1948). |
| thiophene-CH2CN | Blicke, Leonard, JACS, 68, 1934 (1946); Crowe, Nord, J. Org. Chem., 15, 81 (1950); commercially available (Aldrich). |
| thiophene-CN | Meltzer, Lewis, King, JACS, 77, 4062 (1955); C.A. 43, 3816 (1949). |
| thiophene-CN | MacDowell, Greenwood, J. Hetero. Chem. 2, 44 (1965). |
| furan-CH2CN | Commercially available (Aldrich). |
| furan-CN | Ber. 14, 1058 (1881). |
| pyridine-CH2CN | Prijs Helv. Chim. Acta., 31, 571 (1948). |
| pyridine-CH2CN | Commercially available (Aldrich); Burger, Walter, JACS, 72, 1988 (1950). |
| pyridine-CH2CN | Winterfeld, Flick, Arch. Pharm. 26, 448 (1956); Sperber et al., JACS, 73, 5752 (1951). |
| pyridine-CN | Commercially available (Aldrich). |
| pyridine-CN | Do. |
| pyridine-CN | Do. |

Aromatic and aliphatic nitriles are well-known compounds which are prepared, for example, by the methods outlined in classic textbooks such as Organic Preparations by Conrad Weygand, Interscience Publishers, Inc., New York (1945) on pages 115, 255 and 367 and the Chemistry of the Carbon Compounds by Victor Van Richter edited by Richard Anschutz, Third English Edition, Elsevier Publishing Co., Inc., New York, N.Y. (1946) in Volume III at pages 304–306 and in Volume I at pages 325–327 and Laboratory Methods of Organic Chemistry by L. Gattermann revised by H. Wieland, translated from the 24th edition, MacMillan and Co., Limited. London (1943) at pages 137–138 and by the following procedure:

2-Furamide (11.1 g., 0.1 mole, Eastman Kodak Co.) and phosphorus pentoxide (21 g., 0.15 mole) were mixed and heated with a Meeker burner (gently at first and then more strongly) until 2-cyanofuran distill at 130° – 140° C., 5.6 g.

Such amides are prepared by published methods as illustrated in the following table in which it is to be understood that acids are converted to acid chlorides by treatment with thionyl chloride and acid chlorides are converted to amides by reaction with ammonia;

| Amide | Illustrative sources |
|---|---|
| thiazole-CONH2 | Acid, acid chloride, amide: Looker, Wilson, J. Heterocyclic Chem. 2 (4). 348 (1965). Acid, acid chloride, ethyl ester: Hurd, Mori, J. Am. Chem. Soc. 77, 5362 (1955). |
| thiazole-CONH2 | Acid, ethyl ester, amide: U.S. 3,060,187. |
| CH3-oxadiazole-CONH2 (with CH3) | Acid, ethyl ester: Beil. 27, 317. Amide: C.A. 58: 3409. Kochetkov, Sokolov, Luboshnikova, Zh. Obshch. Khim. 32, 1778–85 (1962). |
| oxadiazole-CONH2 | Quilico, Panizzi, Gazz. Chim. Ital. 72, 458 (1942). Quilico, Stagno d'Alcontres, Gazz. Chim. Ital. 79, 654 (1949). Mina, Rateb, Soliman, J. Chem. Soc. 1962, 4234. |
| pyrazine-CONH2 | Amide: commercially available. |
| CH3-oxadiazole-CONH2 | Amide, acid: Beil. 27, 707. Acid chloride: readily prepared by known methods. |
| phenyl-oxadiazole-CONH2-CH3 | Acid, acid chloride: Doyle and Nayler, U.S. 2,996,501 and references cited therein. |
| H3C-oxadiazole-CONH2-phenyl | Acid, acid chloride: Doyle and Nayler, U.S. 2,996,501 and references cited therein. |

Alternative Method for Preparing Compounds of General Formula II

Penicillins of general formula II can be prepared by reaction of 6-bromoacetamidopenicillanic acid with a 3-substituted-1,2,4-oxadiazole-5-one as follows:

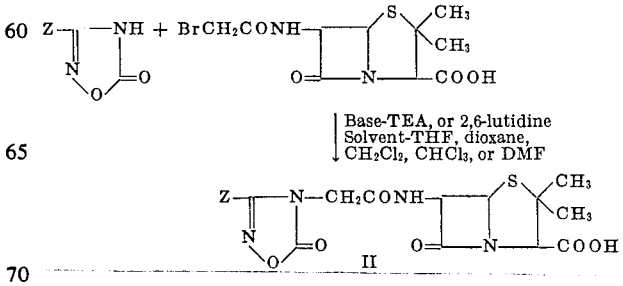

5-Hydroxy-3-(2'-thienyl)-1,2,4-oxadiazole. A mixture of 176.1 g. (1.61 mole) of 2-thienonitrile, 11.9 g. (1.61 mole) of hydroxylamine hydrochloride, 85.3 g. (0.805 mole) of sodium carbonate, 1 liter of 95 percent ethanol and 300 ml. of water was heated at reflux for 17 hours. A small amount of solid was removed by filtration. Additional water was added to the filtrate and the ethanol was stripped off at reduced pressure causing the crystalline product to separate. The filtered product was washed with water. The crude product was heated with benzene most of it going into solution. Cooling this mixture gave after filtration and drying 170.9 g. of 2-thiophenecarboxamine; m.p. 87°–88° (lit. ref. Beil. 18, 290).

Ethyl chloroformate (130.2 g., 1.2 mole) was added gradually to a heated and stirred solution of 170.9 g. (1.2 mole) of 2-thiophenecarboxamide, 96.5 ml. of pyridine and 300 ml. of benzene. An exothermic reaction took place which caused the mixture to reflux. The mixture was refluxed for 15 minutes after the addition of ethyl chloroformate was complete. The mixture was cooled slightly and 600 ml. of water was added. The benzene was distilled off and the remaining aqueous mixture was refluxed for 2.5 hours. After cooling overnight the product was filtered and washed with water. The crude product was dissolved in dilute aqueous sodium hydroxide, the solution carbon treated, and reprecipitated by acidification with acetic acid. There was obtained 139.4 g. of 5-hydroxy-3-(2'-thienyl)-1,2,4-oxadiazole; m.p. 185°–190° dec. The nuclear magnetic resonance and infrared spectra were consistent for the desired compound.

3-(2'-Furyl)-5-hydroxy-1,2,4-oxadiazole. A mixture of 69.5 g., (0.746 mole) of 2-furylnitrile [Ber. 14, 1058 (1881)], 51.8 g. (0.746 mole) of hydroxylamine hydrochloride, 39.5 g. (0.373 mole) of sodium carbonate, 500 ml. of 95 percent ethanol and 150 ml. of water was refluxed overnight. The mixture was filtered and 150 ml. of water was added. The ethanol was stripped off at reduced pressure. The aqueous phase was extracted several times with ethyl acetate. The combined organic extracts were carbon treated, dried with sodium sulfate and the solvent removed at reduced pressure leaving 88.9 g. of 2-furylamide oxime as a viscous oil (lit. ref. C.A. 52, 7292b).

Ethyl chloroformate (76.5 g., 0.705 mole) was added slowly to a heated and stirred solution of 88.9 g. of 2-furylamide oxime, 56.7 ml. (0.705 mole) of pyridine and 200 ml. of benzene. After the addition of ethyl chloroformate was complete the reaction mixture was refluxed an additional 15 minutes. Water (400 ml.) was added and the benzene distilled off. The remaining aqueous mixture was refluxed for 2.5 – 3 hours. After cooling in an ice bath the solid product was collected by filtration and washed with water. The product was dissolved in dilute aqueous sodium hydroxide solution, carbon treated, the solution acidified with acetic acid with ice cooling and the reprecipitated product filtered and washed carefully with ice water. The product was again purified in the same manner giving after drying in vacuo over phosphorus pentoxide 50.1 g. of 3-(2'-furyl)-5-hydroxy-1,2,4-oxadiazole; dec. above 210°.

| Anal. Calcd. for $C_6H_4N_2O_3$: | C, 47.37; | H, 2.65; N, 18.42. |
| Found: | C, 47.27; | H, 2.91; N, 18.39. |

Illustrative examples of the preparation of penicillins of the present invention follow. These examples are given in illustration of, but not in limitation of, the present invention. All temperatures are in degrees Centigrade. "Skellysolve B" is a petroleum ether fraction of b.p. 60° – 68° C. consisting essentially of n-hexane.

DESCRIPTION OF THE PREFERRED EMBODIMENTS

3-Benzyl-1,2,4-oxadiazole-5-one

A solution of 117.2 g. (1 mole) of phenylacetonitrile in 200 ml. of 95 percent ethanol was added to a stirred mixture of 69.5 g. (1 mole) of hydroxylamine hydrochloride, 53 g. (0.5 mole) of sodium carbonate, 200 ml. of water and 400 ml. of 95% ethanol. The mixture was heated at reflux for 3.5 hours, stored at room temperature for two days then refluxed for 3 hours longer. The ethanol was distilled off at reduced pressure. Benzene was added to the residue and the aqueous layer was removed. The benzene solution containing phenylacetamide oxime was dried with sodium sulfate, filtered, and concentrated to a volume of about 400 ml. Reference to phenylacetamide oxime: Beil. 9, 446, II 305.

Ethyl chloroformate (96 ml., 1 mole) was added gradually from a dropping funnel to the above prepared solution of phenylacetamide oxime in benzene plus 80.5 ml. (1 mole) of pyridine initially at room temperature. The exothermic reaction caused the mixture to reflux. The mixture was refluxed for 15 minutes longer, cooled somewhat and 500 ml. of water added. The benzene was distilled off and the remaining aqueous mixture was heated at reflux for 2.5 hours longer. The oil which separated was extracted into benzene. The benzene phase was extracted with 175 ml. of 20 percent sodium hydroxide solution and then with 50 ml. of water. The combined basic extracts were acidified with acetic acid giving oily crystals. The crude product was recrystallized from benzene; m.p. 80°–94°, yield 41 g. The product was combined with 100 ml. of water and 50 ml. of 20 percent sodium hydroxide solution and the mixture heated for one hour on the steam bath. The cooled solution was acidified with acetic acid. An additional 100 ml. of water was added to make the mixture more fluid. The product was collected by filtration. The damp filter cake was dissolved in about 500 ml. of chloroform with warming. The solution was dried with sodium sulfate, filtered, and the solvent distilled off at reduced pressure. The residue was extracted with three 250 ml. portions of boiling cyclohexane and with 500 ml. of boiling 1:1 cyclohexane-benzene. The insoluble residue was slurried with cyclohexane and collected by filtration. There was obtained 25.2 g. of 3-benzyl-1,2,4-oxadiazole-5-one; m.p. 109°–112° (Beil. 27, II 710 reports m.p. 115°). The infrared spectrum was consistent for the desired product.

3-Benzyl-1,2,4-oxadiazole-5-one-4-acetic acid

A solution of 25 g. (0.142 mole) 3-benzyl-1,2,4-oxadiazole-5-one in 300 ml. of methanol was stirred with 20 g. of powdered Molecular Sieves (Linde 4A) for one hour at room temperature. The Molecular Sieves were removed by filtration. To the stirred filtrate was added 8.45 g. (0.156 mole) of sodium methoxide and then 26.2 g. (0.156 mole) of ethyl bromoacetate. The mixture was heated at reflux for 18 hours. The solvent was distilled off at reduced pressure. To the residue was added 200 ml. of acetic acid and 100 ml. of 6 N hydrochloric acid and the mixture refluxed for 1.5 hours. The solvents were distilled off at reduced pressure. To the residue was added water and benzene causing the product to crystallize. The product was filtered, washed on the filter with water and benzene and air dried. The crude product was recrystallized from toluene with a carbon treatment giving 15.9 g. of white crystalline product after drying in vacuo over phosphorus pentoxide; m.p. 111°–113°. The infrared and nuclear magnetic resonance spectra were consistent for the desired product.

| Anal Calcd. for $C_{11}H_{10}N_2O_4$: | C, 56.41; | H, 4.30, N, 11.96. |
| Found: | C, 56.61; | H, 4.42; N, 12.21. |

3-Benzyl-1,2,4-oxadiazole-5-one-4-acetyl chloride

A solution of 5.0 g. (0.0214 mole) of 3-benzyl-1,2,4-oxadiazole-5-one-4-acetic acid in 200 ml. of methylene chloride was gassed briefly (2 minutes) with hydrogen chloride. To the resulting clear solution was added 5.8 g. (0.0278 mole) of phosphorus pentachloride (effervescence) and the mixture stored at room temperature for one hour with occasional swirling. The solvent was stripped off at reduced pressure. The crystalline residue was triturated with cyclohexane and dried at reduced pressure. The infrared spectrum (Nujol) was consistent for the desired acid chloride.

Sodium 6-(3-benzyl-1,2,4-oxadiazole-5-one-4-acetamido)-penicillanate

A solution of 3-benzyl-1,2,4-oxadiazole-5-one-4-acetyl chloride (obtained from 5 g. of the acid) in 90 ml. of acetone was added to a rapidly stirred mixture of 4.62 g. of 6-aminopenicillanic acid, 7.2 g. of sodium bicarbonate, 150 ml. of water and 60 ml. of acetone initially at 5°. The cooling bath was removed and the mixture was stirred for 45 minutes and extracted three times with ethyl acetate. The aqueous phase was layered with ethyl acetate and acidified with 42% phosphoric acid. Two more extractions on the aqueous phase were made with ethyl acetate. The combined ethyl acetate extracts were washed three times with water, dried with sodium sulfate, filtered and treated with 7.6 ml. (0.02 mole) of sodium 2-ethylhexanoate in 1-butanol. The mixture was concentrated somewhat and the crystalline product filtered and washed with ethyl acetate (solid A); yield 4.1 g. The filtrate was stripped of solvent and the residue triturated with anhydrous ether giving 3.2 g. of sodium 6-(3-benzyl-1,2,4-oxadiazole-5-one-4-acetamido)-penicillanate; decomposes 170-180° with prior darkening above about 160°. The infrared and nuclear megnetic resonance spectra were consistent for the assigned structure.

Anal. Calcd. for $C_{19}H_{19}N_4O_6SNa$:  C, 50.21; H, 4.21; N, 12.33.
Found:  C, 50.44, 50.27; H, 4.80, 4.86; N, 12.21, 12.14.

Solid A was extracted at room temperature with 200 ml. of acetone. The insoluble material, which was mostly the sodium salt of the side chain acid, was removed by filtration. The filtrate was stripped of solvent at reduced pressure and the residue triturated with anhydrous ether giving 2.5 g. of sodium 6-(3-benzyl-1,2,4-oxadiazole-5-one-4-acetamido) penicillanate.

6-[N-(Phenylacetimidoyl)aminoacetamido]penicillanic acid.

A solution of 5.5 g. of sodium 6-(3-benzyl-1,2,4-oxadiazole-5-one-4-acetamido)penicillanate in 150 ml. of water plus 50 ml. of dioxane was hydrogenated in the presence of commercial Raney nickel catalyst (No. 28) in a Parr hydrogenation apparatus at an initial pressure of 50 p.s.i. at room temperature for 2 hours, the theoretical amount of hydrogen being taken up. The catalyst was removed by filtration. The filtrate was adjusted to pH 4.5 with 6 N hydrochloric acid and the clear solution concentrated to a small volume. The concentrate was adjusted to pH 2 and then to pH 4.2 with 20 percent sodium hydroxide and concentrated to dryness. Ethyl acetate was added to the residue and this stripped out. The residue was dried in vacuo over phosphorus pentoxide. The product was dissolved with 70 ml. of 95 percent ethanol the insoluble material being removed by filtration. The solution was diluted to the cloud point with acetone causing crystallization of the product. The product was filtered, washed with acetone, dried in vacuo over phosphorus pentoxide and further dried in a vacuum oven at 65° for 3 hours; yield 2.4 g., decomposes 180°-185° with prior darkening above about 160°. The infrared and nuclear magnetic resonance spectra were fully consistent for the desired product.

Anal Calcd. for
$C_{18}H_{22}N_4O_4S$:  C, 55.37;  H, 5.68; N, 14.35.
Found:  C, 54.82; H, 6.13;
  54.80  6.20
  N, 13.88;  $H_2O$, 1.2.
  13.89  1.4.
Found values corrected for 1.2 and 1.4%  $H_2O$:
  C, 55.5; H, 6.0; N, 14.0.
  55.6  6.0  14.1

EXAMPLE 2

5-Hydroxy-3-phenyl-1,2,4-oxadiazole

A solution of 103.1 g. (1 mole) of benzonitrile in 400 ml. of 95 percent ethanol was added to a mixture of 53 g. (0.5 mole) of sodium carbonate, 69.5 g. (1 mole) of hydroxylamine hydrochloride, 200 ml. of water and 300 ml. of 95 percent ethanol. The mixture was refluxed for 18 hours. Most of the ethanol was distilled off and additional water was added. The product, which crystallized on cooling, was filtered, washed with water, and air dried. The product was dissolved in benzene and the benzene distilled off to remove any remaining water leaving a crystalline residue of benzamide oxime (lit. ref. Beil. 9, 304, II 214).

Ethyl chloroformate (96 ml., 1 mole) was added gradually from a dropping funnel to a stirred solution of benzamide oxime in 250 ml. of warm benzene plus 80.5 ml. (1 mole) of pyridine. The exothermic reaction caused the reaction mixture to reflux. The mixture was refluxed for 15 minutes longer, cooled somewhat, and 500 ml. of water added. The benzene was distilled off. The aqueous mixture remaining was refluxed for 2.5 hours. After cooling in an ice bath the crystalline product was collected by filtration. The crude product was purified by dissolving in dilute aqueous sodium hydroxide and acidifying with acetic acid; yield 122.9 g., m.p. 196°-200° (lit ref. Beil. 27, 644, II 698).

3-Phenyl-1,2,4-oxadiazole-5-one-4-acetic acid

A mixture of 32.2 g., (0.193 mole) of ethyl bromoacetate, 10.5 g. of sodium methoxide, 28.5 g. (0.176 mole) of 5-hydroxy-3-phenyl-1,2,4-oxadiazole and 300 ml. of methanol was heated at reflux for 4 hours and then stored at room temperature overnight. To the reaction mixture was added 10 g. of sodium hydroxide and 30 ml. of water. The solution was heated at reflux for 1.5 hours. Water (70 ml.) was added and the methanol distilled off at reduced pressure. Acidification of the aqueous concentrate with 6 N hydrochloric acid gave an oily crystalline precipitate which was filtered and air dried (solid A); yield 29 g. A second crop of product precipitated from the filtrate (solid B); yield 2.1 g. The infrared spectrum of solid B was consistent for 3-phenyl-1,2,4-oxadiazole-5-one-4-acetic acid.

Solid A was recrystallized from 1:1 95 percent ethanol water with a carbon treatment giving 7.8 g. of 5-hydroxy-3-phenyl-1,-2,4-oxadiazole as the first crop. The filtrate deposited a second crop (8.9 g.) (solid C) which had an infrared spectrum consistent for 3-phenyl-1,2,4-oxadiazole-5-one-4-acetic acid. Solid C was recrystallized by dissolving in ethyl acetate and diluting with a large volume of "Skellysolve B." The material which immediately separated (solid D) was removed. The filtrate was stored in the cold to allow the product to crystallize; yield 3.8 g. The infrared and nuclear magnetic resonance spectra were fully consistent for 3-phenyl-1,2,4-oxadiazole-5-one-4-acetic acid.

Anal. Calcd. for $C_{10}H_8N_2O_4 \cdot \frac{1}{2}H_2O$: C, 52.40; H, 3.96;
  N, 12.23; $H_2O$, 3.93.
Found  C, 52.37; H, 4.76;
  N, 12.50; $H_2O$, 3.26.

Solid D was purified with ethyl acetate-"Skellysolve B" as described giving additional product. The filtrate from solid C was concentrated to dryness and the residue purified with ethyl acetate-"Skellysolve B." Thus an additional 2.8 g. of 3-phenyl-1,2,4-oxadiazole-5-one-4-acetic acid was obtained.

3-Phenyl-1,2,4-oxadiazole-5-one-4-acetyl chloride

A suspension of 1.0 g. (0.00455 mole) of 3-phenyl-1,2,4-oxadiazole-5-one-4-acetic acid in 50 ml. of methylene chloride was gassed briefly with hydrogen chloride and 1.1 g. (0.00528 mole) of phosphorus pentachloride added. The mixture was stored at room temperature for 2 hours. The solvent was distilled from the resulting clear solution leaving the acid chloride as an oil.

Sodium 6-(3-phenyl-1,2,4-oxadiazole-5-one-4-acetamido)penicillanate

A solution of 3-phenyl-1,2,4-oxadiazole-5-one-4-acetyl chloride (prepared from 1 g. of the acid) in 10 ml. of acetone was added to a solution of 0.98 g. of 6-aminopenicillanic acid, 1.5 g. of sodium bicarbonate, 30 ml. of water and 20 ml. of acetone at room temperature. The reaction mixture was stirred for 0.5 hour, diluted with 30 ml. of water and extracted once with ethyl acetate. The aqueous phase was acidified with 42 percent phosphoric acid and extracted three times with ethyl acetate. The combined ethyl acetate extracts were washed three times with water, dried with sodium sulfate, filtered, concentrated somewhat and treated with 1.7 ml. (0.00455 mole) of sodium 2-ethyl hexanoate in 1-butanol. A small amount of precipitate which had separated at once was removed by filtration. A solid crystallized from the filtrate which was identified as being primarily the sodium salt of the side chain acid. The filtrate was stripped of solvent and the residual oil was triturated with anhydrous ether giving a filterable solid. The product was filtered, washed with ether and dried in vacuo over phosphorus pentoxide; yield 0.89 g., decomposes 170°–190°. The infrared and nuclear magetic resonance spectra were consistent for sodium 6-(3-phenyl-1,2,4-oxadiazole-5-one-4-acetamido)penicillanate.

Anal. Calcd. for $C_{18}H_{17}N_4O_6SNa$: C, 49.09; H, 3.89; N, 12.72.
Found: C, 44.94; H, 4.69; N, 12.35; $H_2O$, 9.77.
Found values corrected for 9.77% $H_2O$: C, 48.75; H, 3.61; N, 13.40.

6-[N-(Benzimidoyl)aminoacetamido]penicillanic acid

A solution of 0.74 g. of sodium 6-(3-phenyl-1,2,4-oxadiazole-5-one-4-acetamido)-penicillanate in 100 ml. of water was hydrogenated in the presence of commercial Raney nickel catalyst on a Parr hydrogenation apparatus at room temperature at an initial pressure of 50 p.s.i. for 1.5 hours. The catalyst was removed by filtration. The filtrate was adjusted to pH 4.5 with 6 N hydrochloric acid, concentrated to a small volume and readjusted to pH 4.5. The solution was stripped to dryness. The residue was triturated with anhydrous ether, filtered and dried in vacuo over phosphorus pentoxide; yield 0.57 g., gradually decomposes above about 165°. The infrared and nuclear magnetic resonance spectra were consistent for 6-[N-(benzimidoyl)aminoacetamido]gqpenicillanic acid.

EXAMPLE 3

3-(p-Chlorobenzyl)-1,2,4-oxadiazole-5-one

A solution of 151.6 g. (1 mole) of p-chlorophenylacetonitrile in 200 ml. of 95 percent ethanol was added to a stirred mixture of 69.5 g. (1 mole) of hydroxylamine hydrochloride, 53 g. (0.5 mole) of sodium carbonate, 200 ml. of water and 400 ml. of 95 percent ethanol. The mixture was heated at reflux for 19 hours. Most of the ethanol was stripped off at reduced pressure causing the crude p-chlorophenylacetamide oxime to separate as an oil. The product was extracted into 600 ml. of benzene. The benzene extract was washed two times with water. The product which started to crystallize from the benzene phase was kept in solution by warming. The benzene solution was concentrated to about 400 ml.

Ethyl chloroformate (108.5 g., 1 mole) was added dropwise to a stirred mixture of the above prepared solution of p-chlorophenylacetamide oxime in benzene plus 80.5 ml. (1 mole) of pyridine. The reaction mixture was brought to reflux after about three-quarters of the ethyl chloroformate had been added. The mixture was refluxed for 25 minutes after the addition was completed. The mixture was cooled to room temperature and 500 ml. of water were added. The benzene was distilled off. The aqueous residue was heated at reflux for 2 hours. The reaction mixture was cooled in an ice bath and the aqueous phase decanted from the oil. To the residual oil was added a solution of 45 g. of sodium hydroxide in 500 ml. of water and the mixture refluxed for 2 hours. The cooled mixture was adjusted to pH 3–4 with concentrated hydrochloric acid. The product was collected by filtration and washed with water. The product was dissolved in 500 ml. of boiling benzene, the hot solution filtered and the filtrate diluted with 500 ml. of cyclohexane giving 56 g. of product. The crude product was recrystallized from 1:1 95 percent ethanol-water with a carbon treatment and then from benzene. The product was dissolved in dilute aqueous sodium hydroxide and the filtered solution was acidified with glacial acetic acid; m.p. 168°–172°, yield, after drying in vacuo over phosphorus pentoxide, 21.6 g. The infrared and nuclear magnetic resonance spectra were consistent for 3-(p-chlorobenzyl)- 1,2,4-oxadiazole-5-one.

Anal. Calcd. for $C_9H_7ClN_2O_2$: C, 51.32; H, 3.35; N, 13.30
Found: C, 51.46; H, 3.63; N, 13.46, 13.53.

The combined benzene filtrates deposited a second crop of product which was purified by dissolving in dilute sodium hydroxide and reprecipitating with acetic acid; yield 3.2 g., m.p. 166°–170°.

3-(p-Chlorobenzyl)-1,2,4-oxadiazole-5-one-4-acetic acid

A solution of 23.2 g. (0.0992 mole) of 3-(p-chlorobenzyl)-1,2,4-oxadiazole-5-one in 450 ml. of methanol was stirred at room temperature with 20 g. of powdered Molecular Sieves (Linde 4A) for 1.5 hours. The Molecular Sieves were removed by filtration. The filtrate was added to a freshly prepared solution of sodium methoxide in methanol made by adding 2.5 g. (0.11 mole) of sodium to 100 ml. of methanol. Ethyl bromoacetate (18.4 g., 0.11 mole) was added. The stirred mixture was refluxed for 19 hours in an apparatus protected from atmospheric moisture. The solvent was distilled off at reduced pressure. To the residue was added 200 ml. of glacial acetic acid and 100 ml. of 6 N hydrochloric acid and the mixture heated at reflux for 2 hours. The volatile materials were stripped off at reduced pressure. Water and benzene were added to the residue causing the product to crystallize. The product was filtered, washed with water and benzene and twice recrystallized from toluene with a carbon treatment each time; yield 8.9 g., m.p. 145°–149°. The infrared and nuclear magnetic resonance spectra were fully consistent for the desired product.

Anal. Calcd. for $C_{11}H_9ClN_2O_4$: C, 49.18; H, 3.38; N, 10.43
Found: C, 49.43; H, 3.54; N, 10.68 10.69.

Sodium 6-[3-(p-chlorobenzyl)-1,2,4-oxadiazole-5-one-4-acetamido]-penicillanate

A suspension of 4.0 g. of 3-(p-chlorobenzyl)-1,2,4-oxadiazole-5-one-4-acetic acid in 200 ml. of methylene chloride was gassed for about 1 minute with hydrogen chloride. Phosphorus pentachloride (4.04 g.) was added (effervescence) and the reaction mixture was stored at room temperature for 2 hours with occasional swirling. The solvent was stripped off at reduced pressure. The residual oil was triturated in the cold with "Skellysolve B" and dried in vacuo to remove the last traces of solvent leaving 3-(p-chlorobenzyl)-1,2,4-oxadiazole-5-one-4-acetyl chloride as residue.

A solution of the acid chloride in 90 ml. of acetone was added in one portion to a rapidly stirred solution of of 3.23 g. of 6-aminopenicillanic acid, 5.02 g. of sodium bicarbonate, 150 ml. of water and 60 ml. of acetone at room temperature. The reaction mixture was stirred for one-half hour at room temperature and then extracted 3 times with ethyl acetate. The aqueous phase was layered with ethyl acetate and acidified with 42% phosphoric acid. Two more extractions with ethyl acetate were made on the aqueous phase. The combined ethyl acetate extracts were washed 3 times with water, dried with sodium sulfate, filtered and treated with 5.7 ml. (0.01495 mole) of sodium 2-ethylhexanoate in 1-butanol giving a clear solution. The solvent was stripped off at reduced pressure. The residue was triturated with anhydrous ether and the solid collected by filtration. The solid was extracted with 150 ml. of acetone. The filtered acetone solution was stripped of solvent. The residue was triturated with anhydrous ether giving a solid; yield 4.7 g. after drying in vacuo over phosphorus pentoxide, decomposes 175°–180°. The infrared and nuclear magnetic resonance spectra were consistent for sodium 6-[3-(p-chlorobenzyl)-1,2,4-oxadiazole-5-one-4-acetamido]penicillanate.

Anal. Calcd. for $C_{19}H_{18}ClN_4O_6SNa$: C, 46.68; H, 3.71; N, 12.00
Found: C, 46.01; H, 3.96; N, 11.58; $H_2O$, 2.1.
Found values corrected for 2.1% $H_2O$: C, 47.0; H, 3.8; N, 11.8.

6-[N-(p-Chlorophenylacetimidoyl)aminoacetamido]penicillanic acid

A solution of 4.5 g. of sodium 6-[3-(p-chlorobenzyl)-1,2,4-oxadiazole-5-one-4-acetamido]penicillanate in 200 ml. of water was hydrogenated in the presence of commercial Raney nickel catalyst (No. 28) on a Parr hydrogenation apparatus at an initial pressure of 50 p.s.i. at room temperature for 1 hour. The catalyst was removed by filtration. The filtrate was adjusted to pH 2.5 with 6 N hydrochloric acid and then to pH 4.2 with 20 percent sodium hydroxide. The water was stripped off at reduced pressure. The residue was further dried by adding ethyl acetate and then acetone and evaporating to dryness. The residue was extracted with 95 percent ethanol the insoluble material being removed by filtration. To the filtrate was added about 30 ml. of acetone. The oily material which immediately separated was removed by filtration. The clear filtrate was stored in the cold overnight causing the product to crystallize. The product was filtered, washed with 1:1 95 percent ethanol-acetone and with acetone and dried in a vacuum oven at 60°; yield 1.42 g., decomposes 165°–180°. The infrared and nuclear magnetic resonance spectra were consistent for the desired product.

EXAMPLE 4

3-Benzyl-1,2,4-oxadiazole-5-one

Phenylacetonitrile (235 g., 2 moles) was added to a stirred mixture of 167 g. (2.4 moles) of hydroxylamine hydrochloride 127 g. (1.2 mole) of sodium carbonate, 1 l of methanol and 600 ml. of water. The stirred mixture was heated at 50° (solution) for 21 hours. The methanol was distilled off at reduced pressure. The crude amide oxime which separated as an oil was extracted into 700 ml. of chloroform. The chloroform extract was washed 3 times with water, dried with sodium sulfate, filtered and about 200 ml. of solvent distilled off at reduced pressure to remove any remaining water leaving a dry solution of phenylacetamide oxime in chloroform.

Ethyl chloroformate (190 ml., 2 moles) was added in a slow stream to a stirred and cooled (25°–30°) solution of the above obtained chloroform solution of phenylacetamide oxime, an additional 1.5 l of chloroform and 280 ml. (2 moles) of triethyl amine. The solution was concentrated at reduced pressure (in 3 batches) until a thick residue of product and triethylamine hydrochloride remained. The batches were combined and extracted 3 times with water. The chloroform-product phase was stripped at reduced pressure to remove the remainder of the solvent. To the residue was added a solution of 120 g. of sodium hydroxide in 1 l of water. The vigorously stirred mixture was heated rapidly during about 10 minutes to 70°–80 causing most of the material to go into solution. The cooled (25°) mixture was extracted once with 300 ml. of benzene to remove a small amount of insoluble oil. The ice cooled aqueous phase was acidified (pH 2–3) with concentrated hydrochloric acid. The product was collected by filtration, washed with water and air dried; yield 153.1 g. The product was suspended in 800 ml. of water and aqueous sodium hydroxide solution (69 g. of sodium hydroxide in 200 ml. of water) added in slight excess of the amount needed to dissolve all of the solid. The solution was carbon treated, filtered and acidified with concentrated hydrochloric acid. The product was filtered, washed with water and air dried; yield 119.6 g., m.p. 111°–114°.

3-Benzyl-1,2,4-oxadiazole-5-one-4-acetic acid

A solution of 10 g. (0.057 mole) of 3-benzyl-1,2,4-oxadiazole-5-one, 10.4 g. (0.0625 mole) of ethyl bromoacetate and 8.8 ml. (0.0625 mole) of triethylamine in 100 ml. of tetrahydrofuran was stirred at room temperature for 5 hours. During this time a thick precipitate of triethylamine hydrobromide formed. After storage at room temperature for 64 hours the solid was removed by filtration. The filtrate was concentrated at reduced pressure to remove solvent. The residue of crude ethyl 3-benzyl-1,2,4-oxadiazole-5-one-4-acetate was combined with 80 ml. of glacial acetic acid and 40 ml. of 6 N hydrochloric acid and the solution refluxed for 1.5 hours. The volatile materials were distilled off at reduced pressure. An infrared spectrum of the residue indicated that the hydrolysis of the ester was incomplete. Therefore, 80 ml. of glacial acetic acid and 40 ml. of 6 N hydrochloric acid were added and the solution was refluxed for 2.5 hours. The volatile materials were removed at reduced pressure. Water and benzene were added to the residue and the mixture stored at room temperature overnight to crystallize the product. After cooling in an ice bath the product was filtered and air dried. Recrystallization from toluene with a carbon treatment gave 8.0 g. (60 percent yield) of 3-benzyl-1,2,4-oxadiazole-5-one-4-acetic acid; m.p. 113°–115°.

EXAMPLE 5

The procedures of Example 2 are repeated while replacing the benzonitrile used therein with an equimolar weight of the nitrile prepared by $P_2O_5$ dehydration of each of the corresponding amides having the following structures:

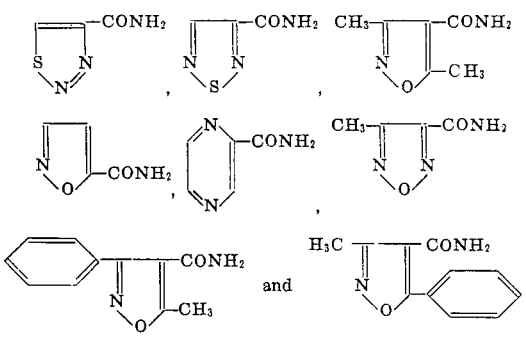

to produce, respectively, the compounds of the formulae

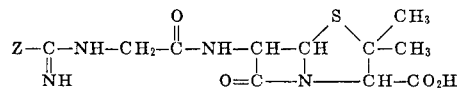

and

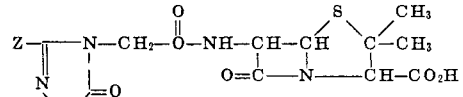

wherein Z is

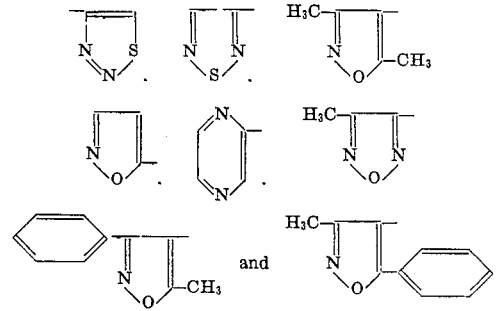

When necessary the amide is prepared by converting the corresponding acid to its acid chloride with thionyl chloride and thence to the amide by treatment of the acid chloride with ammonia in the usual manner.

EXAMPLE 6

The procedures of Example 2 are repeated while replacing the benzonitrile used therein with an equimolar weight of the nitrile of the formula R - CN wherein R is dichloromethyl, trichloromethyl, n-propyl, isopropyl, n-butyl, isobutyl, sec-butyl, t-butyl, n-pentyl, cyclobutyl, cyclopentyl, cyclohexyl and cycloheptyl, respectively to produce, respectively, the corresponding compounds of the formulas

I claim:
1. Compounds having the formula wherein Z is (lower)alkyl, cycloalkyl having 4, 5, 6 or 7 carbon atoms, monohalo(lower)alkyl, dichloromethyl, trichloromethyl, (lower)alkenyl of 2 to 6 carbon atoms, wherein $n$ is zero or one and $R^1$, $R^2$ and $R^3$ each is hydrogen, nitro, di(lower)alkylamino, (lower)alkanoylamino, (lower)-alkanoyloxy, (lower)alkyl, amino, hydroxy, (lower)alkylthio, (lower)alkoxy, sulfamyl, chloro, iodo, bromo, fluoro or trifluoromethyl; or a nontoxic pharmaceutically acceptable salt thereof.

2. A compound of claim 1 wherein Z is phenyl, benzyl, thenyl, thienyl, furyl or (lower)alkyl.

3. A compound of claim 1 wherein Z is benzyl, 2-thenyl or 3-thenyl.

4. A compound of claim 1 wherein Z has the structure wherein R is hydrogen, hydroxy, amino, methyl, methoxy or chloro.

5. The compound having the formula

6. The compound having the formula

7. The compound having the formula

8. A nontoxic, pharmaceutically acceptable salt of the compound of claim 5.
9. The sodium salt of the compound of claim 5.
10. The potassium salt of the compound of claim 5.
11. The hydrochloride of the compound of claim 5.
12. The zwitterion form of the compound of claim 5.

* * * * *